(12) United States Patent
Hebuterne et al.

(10) Patent No.: US 8,991,021 B2
(45) Date of Patent: Mar. 31, 2015

(54) METHOD OF MACHINING ROTOR BLADE WEAR INDICATORS, AND ROTOR BLADE PLUG FOR IMPLEMENTING THE METHOD

(75) Inventors: Damien Hebuterne, Breuillet (FR); Janvier Lecomte, Montgeron (FR)

(73) Assignee: Snecma, Paris (FR)

( * ) Notice: Subject to any disclaimer, the term of this patent is extended or adjusted under 35 U.S.C. 154(b) by 906 days.

(21) Appl. No.: 13/150,649

(22) Filed: Jun. 1, 2011

(65) Prior Publication Data

US 2011/0296687 A1 Dec. 8, 2011

(30) Foreign Application Priority Data

Jun. 3, 2010 (FR) ...................................... 10 54347

(51) Int. Cl.
| | |
|---|---|
| *B23K 26/16* | (2006.01) |
| *B23K 26/10* | (2006.01) |
| *B23P 15/02* | (2006.01) |
| *B23K 26/18* | (2006.01) |
| *F01D 5/20* | (2006.01) |

(52) U.S. Cl.
CPC ................ *B23K 26/16* (2013.01); *B23K 26/18* (2013.01); *F01D 5/20* (2013.01); *Y02T 50/67* (2013.01); *Y02T 50/673* (2013.01); *F05D 2230/13* (2013.01)
USPC ............................ 29/23.51; 29/56.5; 29/889.7

(58) Field of Classification Search
CPC ........... B23B 2215/81; B23K 26/0661; B23K 26/16; B23K 26/18; B23P 15/02; B23P 15/04; F01D 5/16; F01D 5/20
USPC ........ 29/889.7, 889.71–889.721, 23.51, 56.5; 416/61, 224
See application file for complete search history.

(56) References Cited

U.S. PATENT DOCUMENTS

| | | | |
|---|---|---|---|
| 4,884,820 A | 12/1989 | Jackson et al. | |
| 5,052,695 A * | 10/1991 | Curtis | ............................. 29/235 |
| 5,222,617 A | 6/1993 | Gregory et al. | |
| 6,333,488 B1 | 12/2001 | Lawrence et al. | |
| 6,495,796 B2 * | 12/2002 | Fukaya et al. | ........... 219/121.84 |
| 7,321,104 B2 * | 1/2008 | Wessner | ................... 219/121.67 |
| 2004/0074883 A1 | 4/2004 | Kilburn | |
| 2005/0035096 A1 | 2/2005 | Kilburn | |
| 2008/0012241 A1 * | 1/2008 | Norman et al. | ................ 277/616 |

FOREIGN PATENT DOCUMENTS

| | | | |
|---|---|---|---|
| DE | 10249756 A1 * | 5/2004 | ............. B23K 26/38 |
| EP | 0 292 250 A1 | 11/1988 | |

(Continued)

OTHER PUBLICATIONS

French Preliminary Search Report and Written Opinion issued Jan. 12, 2011, in French 1054347, filed Jun. 3, 2010 (with English Translation of Categories of Cited Documents).

*Primary Examiner* — Alexander P Taousakis
*Assistant Examiner* — Matthew P Travers
(74) *Attorney, Agent, or Firm* — Oblon, McClelland, Maier & Neustadt, L.L.P.

(57) ABSTRACT

A method for machining at least one aircraft gas turbine engine rotor blade wear indicator is provided. The method includes machining the wear indicator using a laser so as to melt part of the blade, and collecting the molten material of the blade. The method further includes fitting a plug into the bathtub squealer. The plug includes at least one cavity for receiving the molten blade material.

4 Claims, 4 Drawing Sheets

(56) References Cited

FOREIGN PATENT DOCUMENTS

| | | |
|---|---|---|
| EP | 1 081 239 A1 | 3/2001 |
| EP | 2 236 239 A1 | 10/2010 |
| FR | 2 928 405 A1 | 9/2009 |
| GB | 2 249 279 A | 5/1992 |
| JP | 4-262889 | 9/1992 |

\* cited by examiner

METHOD OF MACHINING ROTOR BLADE WEAR INDICATORS, AND ROTOR BLADE PLUG FOR IMPLEMENTING THE METHOD

BACKGROUND OF THE INVENTION

1. Field of the invention

A field of the invention is that of aircraft gas turbine engine rotor blades. The invention relates to a method for machining rotor blade wear indicators.

2. Description of The Related Art

A turbine disk of a gas turbine engine conventionally comprises a plurality of turbine blades secured to the disk and driven in rotation by a flow of hot air from the combustion chamber of the engine. As the engine ages, functional clearances arise and the turbine blades may come into contact with the engine casing and this wears the blade ends.

SNECMA application FR 2 928 405 discloses a turbine blade which, at its distal end comprises an open cavity or bathtub squealer, delimited by a bottom wall which extends over the entire tip of the blade and by a circumferential side wall that forms a rim. The rim provides a wearing region between the bottom wall and the casing that allows contact between the distal ends of the blade and the casing to be absorbed.

In order to measure blade wear, it is known practice to machine wear indicators into the ends of the blades when the blades are new. Conventionally, the wear indicators are formed on the suction face of the blade and take the form, firstly, of a series of radial grooves formed in the rim of the blade bathtub squealer and secondly of a chamfer formed near the trailing edge of the blade.

Thus, when the blade comes into contact with the engine casing, the rim of the bathtub squealer becomes worn, together with its wear indicators. In order to determine the degree of blade wear, a visual inspection is carried out to check whether the wear indicators are still visible or whether their appearance has changed. For preference, the radial grooves are of increasing length and correspond respectively to increasing levels of wear.

In order to form the wear indicators it is known practice for the blade to be machined using an EDM (Electrical Discharge Machining) method or by milling. The machined blade is then coated with a thermal barrier coating known by the abbreviation TBC. To form the turbine rotor, a plurality of coated blades is mounted on a turbine disk. Conventionally, for a turbine rotor, of the plurality of blades just a few comprise wear indicators. These few blades are angularly distributed at the periphery of the turbine disk.

In order for the turbine rotor to be concentric, a surface grinding step in which all the turbine rotor blades are machined at their ends is conventionally carried out in order to correct turbine rotor concentricity defects. The result of this is that a new turbine rotor, i.e. one that has come directly from the manufacturing stage, may exhibit blades the wear indicators of which have been machined because of the surface grinding operation. In other words, a wear indicator may indicate that a blade is worn even though this blade is new.

In order to eliminate this disadvantage, it has been proposed for the wear indicators to be machined again after surface grinding so that these indicators correspond to those of a new blade. One immediate solution would be to machine the surface-ground blades that have a thermal barrier coating TBC using an EDM method or by milling, but this would impair the thermal barrier coating. In particular, milling coated blades causes the thermal barrier coating to "flake" and lose its effectiveness. The other disadvantages of this type of machining are that it carries the risk of contaminating the surface of the coated rotor blades and that it is awkward and expensive to implement.

Another solution would be to machine the blades individually but that would entail removing the blades from their turbine disk beforehand and this would considerably lengthen the machining method and increase the cost thereof. By way of example, a method according to the prior art requires at least one day of manual work in order to obtain a satisfactory result.

BRIEF SUMMARY OF THE INVENTION

The invention aims to eliminate these disadvantages and proposes a method for machining wear indicators that is suited to surface-ground rotor blades with their thermal barrier coatings that does not entail removing the blades from their rotor disk.

To this end, the invention relates to a method for machining at least one aircraft gas turbine engine rotor blade wear indicator, comprising a step of machining the wear indicator using a laser so as to melt part of the blade, and a step of collecting the molten material of the blade.

By virtue of the invention, a wear indicator is advantageously formed in a blade end irrespective of the presence of a thermal barrier coating on the blade. Thus, a wear indicator can be machined and surface ground at any stage of its manufacture using the same laser equipment. Specifically, laser machining is unable to affect the thermal barrier coating TBC which is locally melted. A step of blowing transverse to the surface of the blade to be machined improves the laser machining of the blade.

Moreover, according to the method, the molten blade material is collected after laser machining so that it does not adhere to the surface of the blade to protect it. For preference, the molten material is collected by suction.

For preference, with the blade at one end comprising a bathtub squealer defining a bottom wall and at least one rim, the wear indicator being machined in the rim, the method comprises a step of collecting the molten blade material in said bathtub squealer.

For preference also, the laser beam is designed to pass through the rim of the bathtub squealer from the outside of the bathtub squealer towards the inside of the bathtub squealer so that the molten material is guided into the inside of the bathtub squealer. It is simple and quick to collect from the bathtub squealer.

According to one aspect of the invention, the method comprises a step of fitting a plug into said bathtub squealer, said plug comprising at least one cavity for receiving the molten blade material. The plug firstly allows the cavity of the bathtub squealer to be filled by being in contact with the bottom wall and the rim of the bathtub squealer and secondly allows the molten material to be collected in the bathtub squealer via its receiving cavity. Thus, any molten material is collected during the machining process by the plug without coming into contact with the bottom wall or the rim of the bathtub squealer.

For preference, the receiving cavity of the plug is formed facing the blade wear indicator. Following laser machining, the molten material is carried directly into the receiving cavity of the plug.

In an alternative form, with the laser being directed substantially vertically during machining, the receiving cavity of the plug is positioned vertically under the blade wear indicator so as to collect the molten blade material using gravity.

For preference also, with the blade being mounted on a rotor disk secured to a stand, the method comprises a step of pushing the plug into the blade bathtub squealer so as to immobilize the blade with respect to the rotor disk during the machining process. In other words, pressure is applied to the plug so that the plug presses the blade onto its disk in order to immobilize it. The plug advantageously allows pressure not to be exerted directly on the blade, the plug then performing a damping function.

Thus, in addition to performing its first function of receiving molten material, the plug is advantageously able to immobilize the blade with respect to its rotor disk, any play between these two elements being eliminated. Further, that allows the blade to be machined while it is mounted on its rotor disk without the need to remove it beforehand. This is particularly advantageous for surface grinding blades after they have been mounted so as to eliminate concentricity defects.

In an alternative form, the blade comprises a thermal barrier coating at the time of its machining. The laser machining advantageously allows the thermal barrier coating not to be damaged, this coating maintaining its properties, the blade being affected only locally in the region of its wear indicators.

The invention also relates to a plug for implementing the method as set out hereinabove comprising a body intended to be mounted in a bathtub squealer formed at an end of an aircraft gas turbine engine rotor blade, the body comprising a lower wall intended to be in contact with the bottom wall of the bathtub squealer, a side wall intended to be in contact with the rim of the bathtub squealer and an upper wall, said side wall comprising at least one receiving cavity intended to receive molten blade material.

The plug advantageously allows the molten material to be collected in a simple and practical way without the need to remove the blade from its rotor disk.

For preference, the receiving cavity extends from the side wall to the upper wall of the plug. The molten material can thus be collected from the side wall to be collected via the upper wall of the plug which is easy to access. The molten material does not remain in the plug but is simply guided, making it possible to limit the time spent cleaning the plug before it is next used.

According to an alternative form of the invention, the plug is made of Teflon, as this allows it not to deform under contact with the laser ray.

According to one aspect of the invention, the device for machining a rotor blade mounted radially on an aircraft gas turbine engine rotor disk for implementing the method as set out hereinabove, comprises:
  a stand for positioning the rotor disk;
  a laser machining module designed to emit a laser beam toward the rotor blade so as to form a wear indicator; and
  a module for immobilizing the blade in the machining position and designed to apply a radial pressure force on the blade in order to immobilize it.

For preference, with a bathtub squealer being formed at a tip of said rotor blade and a plug being housed in said bathtub squealer, the immobilizing module is designed to apply the force to the plug.

For preference, the device further comprises a suction duct, connected to said plug, designed to suck up the molten blade material via the plug.

BRIEF DESCRIPTION OF THE SEVERAL VEIWS OF THE DRAWINGS

In the detailed description which follows, which is given solely by way of example, reference is made to the attached drawings, in which.

DETAILED DESCRIPTION OF THE INVENTION

Figure 1:
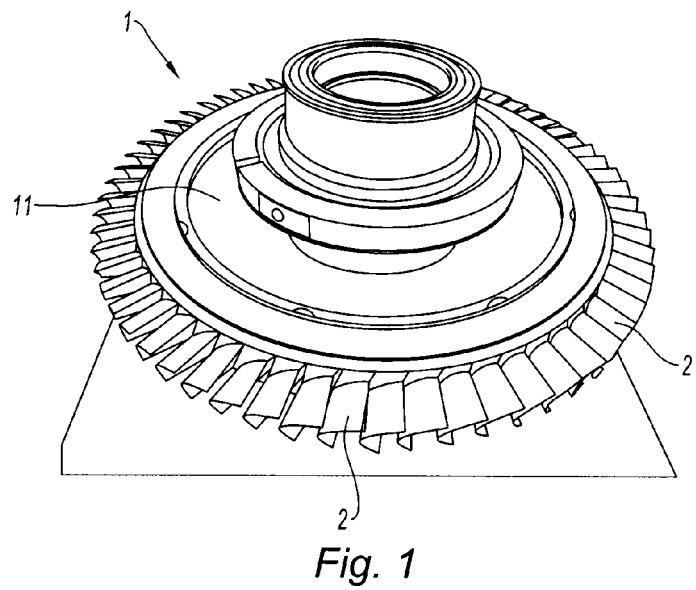
FIG. 1 is a perspective view of a rotor with a plurality of rotor blades.
Figure 2:
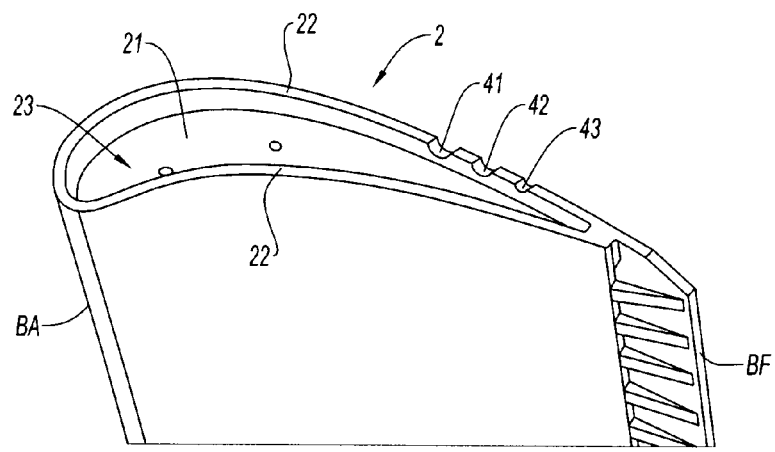
FIG. 2 is a perspective view of the bathtub squealer of a rotor blade comprising wear indicators.

FIG. 1 depicts a high-pressure turbine rotor 1 for an aircraft gas turbine engine which comprises a high-pressure body and a low-pressure body. The turbine rotor 1 comprises a rotor disk 11 on which a plurality of rotor blades 2 are mounted. A rotor blade 2 conventionally comprises a root intended to be mounted in the rotor disk 11 and a tip that forms the free part of the rotor blade 2. The rotor blade 2 runs radially with respect to the rotor disk 11 and, in the conventional way, has a leading edge BA and a trailing edge BF as depicted in FIG. 2. The cross section of the rotor blade 2 tapers from its leading edge BA toward its trailing edge BF.

The upper radial end of the tip of the rotor blade 2 is hollowed radially inward to form an open cavity delimited by a bottom wall 21 which extends over the entire end of the blade 2 and a circumferential side wall 22 defining a radially extending rim 22. This cavity is known by those skilled in the art by the name of a bathtub squealer and is referenced 23 in FIG. 2. The rim 22 forms a wearing region between the bottom wall and the casing of the engine to absorb contact between the distal end of the blade and the casing. The rim 22 extends the wall on the pressure face side of the blade 2 and the wall on the suction face side of the blade. In addition, the circumferential rim 22 is able to limit the passage of gas from the pressure face toward the suction face which passage would generate aerodynamic losses detrimental to efficiency.

Some blades 2 of the rotor 1 comprise wear indicators in order visually to indicate whether the rotor 1 is worn. By way of example, the rotor 1 in FIG. 1 comprises three rotor blades 2 that have wear indicators, these blades 2 being angularly distributed over the rotor disk 11.

Figure 3:
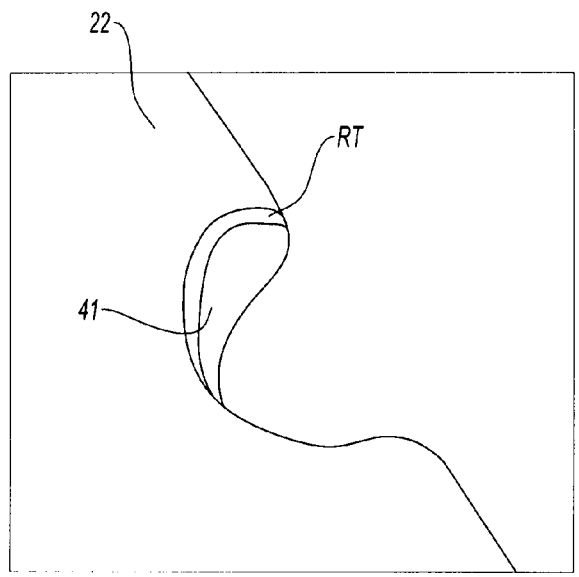
FIG. 3 is a close-up view of a wear indicator machined according to the method according to the invention.

With reference to FIG. 2, the rim 22 of the bathtub squealer 23 comprises radial notches 41, 42, 43 near the trailing edge BF of the rotor blade 2 which form wear indicators 41, 42, 43. As illustrated in FIG. 3, the wear indicator 41 is in the form of a curved radial notch passing through the rim 22 of the bathtub squealer 23. When the blade 2 is worn, the height of the rim 22 decreases. From a certain degree of wear onwards, the wear indicator is no longer visible. Thus, a degree of wear affecting the blade 2 can be detected visually.

The way in which the wear indicators 41-43 of the rotor blade 2 are machined will now be described.

Figure 4:
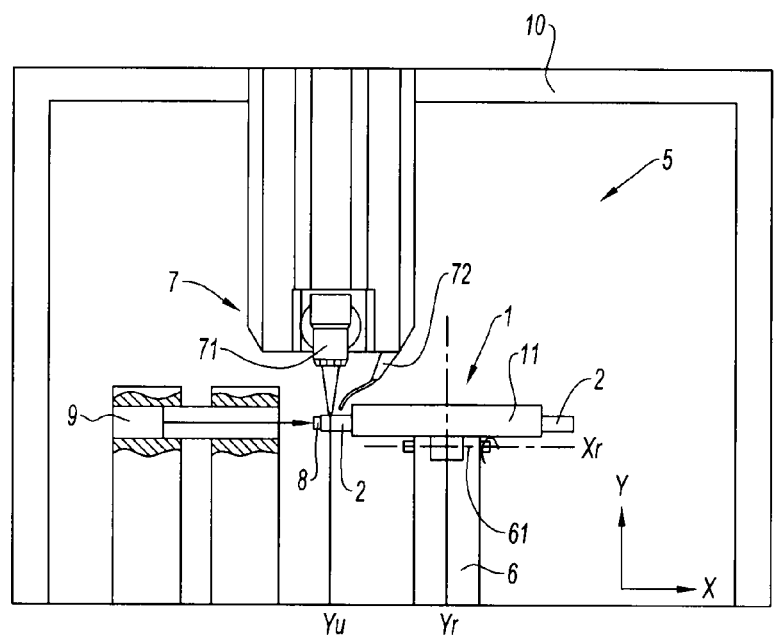
FIG. 4 is a schematic depiction of a machining device according to the invention.

With reference to FIG. 4, a machining device 5 according to the invention comprises a stand 6 designed to hold the rotor 1 in position during machining and a laser machining module 7 designed to emit a laser beam for machining the wear indicators 41-43 of the rotor blades 2.

Hereinafter, the elements of the machining device 5 are identified in an orthonormal frame of reference (X, Y, Z) as depicted in FIG. 4, in which the X-axis represents the horizontal axis directed from left to right, the Y-axis represents the vertical axis directed from the bottom upwards, and the Z-axis represents the depth axis directed from the rear forward.

The stand 6 is in the form of a vertical post extending along a vertical axis Yr, comprising a positioning plate 61 on which the rotor disk 11 is mounted. In this example, the axis of the rotor disk 11 is vertical and coaxial with the axis Yr of the stand 6. Advantageously, the positioning plate 61 is designed to be rotationally driven about the axis Yr, which allows a rotor blade 2 to be positioned precisely in line with the laser module 7 that emits a laser beam along a substantially vertical machining axis Yu as will be detailed hereinafter. Further, the positioning plate 61 is designed to tilt about a pivot of axis Xr, orthogonal to the axis Yr, so that the rotor blade 2 can be positioned precisely with respect to the laser module 7.

Thus, when the wear indicators 41-43 of a first rotor blade 2 have been machined, the positioning plate 61 is rotated so that a second rotor blade 2 can be positioned in line with the laser module 7 and the plate 61 is tilted if necessary in order to place the wear indicator that is to be machined in line with the laser beam L. Thus, the wear indicators 41-43 of the various rotor blades 2 can be machined with the rotor blades 2 still mounted on the rotor disk 11.

Figure 6:
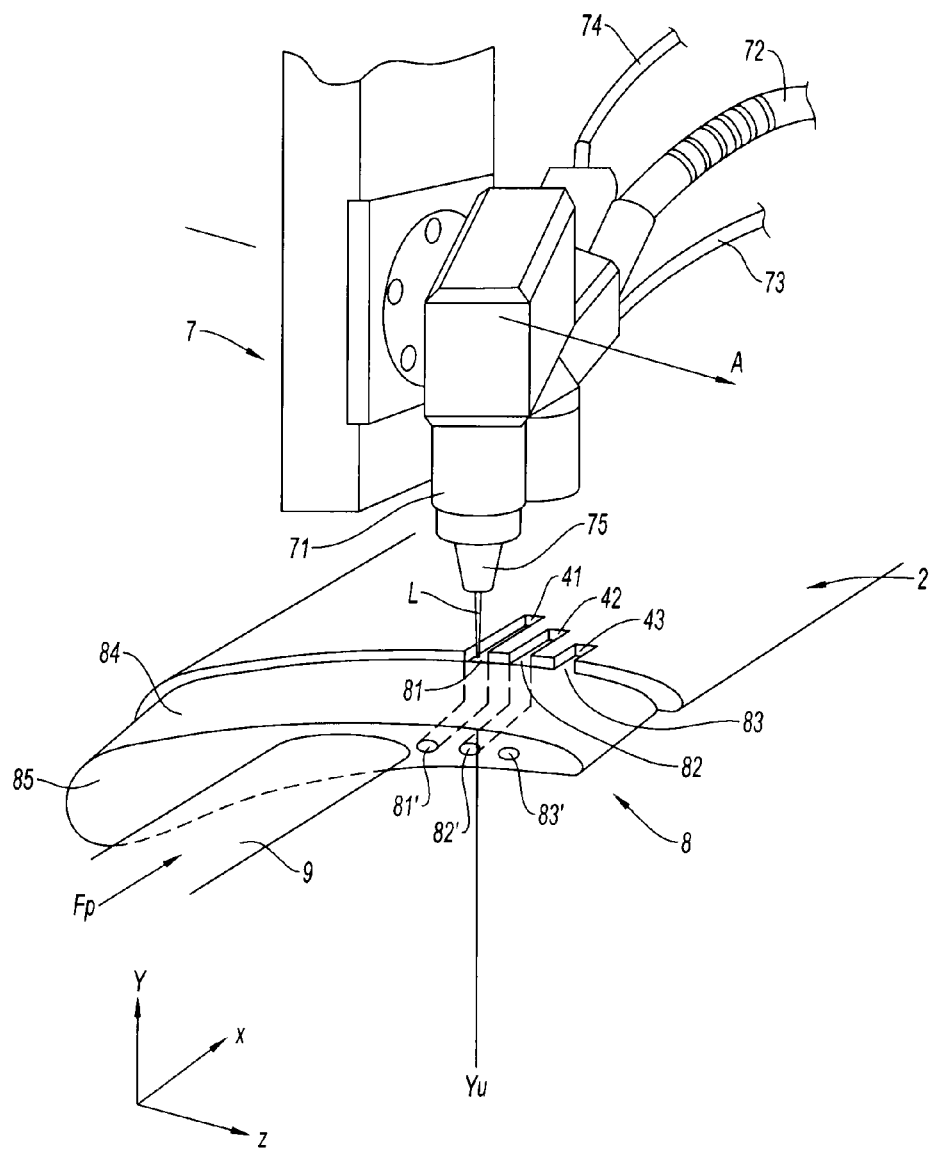
FIG. 6 is a close-up view of the laser head of the device of FIG. 4 during the machining of a rotor blade wear indicator.

With reference to FIGS. 4 and 6, the laser module 7 more particularly comprises a laser head 71, a laser distribution fiber 72, a gas blower 73 and a positioning camera 74.

As illustrated in FIG. 6, the laser head 71 has a nozzle 75, also known as the cutting head, directed along the machining axis Yu, which is designed to emit a laser beam L onto the rotor blade 2 in order to form the wear indicators 41-43. The laser head 71 is advantageously orientable so that the part of the rotor blade 2 that is to be machined can be reached precisely and in a practical way. The laser beam L is emitted by a laser source (not depicted) and is conveyed to the laser nozzle 75 by a laser distribution fiber 72 that connects the laser source to the nozzle 75. In this example, the laser source used is an Nd-YAG source which is short for "neodymium-doped yttrium aluminum garnet". This type of laser source can easily be incorporated into a machining cell because of its flexibility and adaptability. By way of alternative, a laser source of the Q-switched YAG type (which is a pulsed laser using pulses of the order of a few nanoseconds long) associated with a galvanometric head might also be suitable.

The laser head 71 is associated with a gas blower 73 designed to inject a stream of gas near the machining region so as to cause the molten rotor blade 2 material to flow as will be detailed hereinafter. For preference, the stream passes transversally with respect to the surface of the blade being machined. The positioning camera 74 allows the laser head 71 to be positioned precisely at the edge of the blade that forms the starting point for machining. It goes without saying that other proximity sensors might also be suitable for performing this function.

Thereafter, a laser head 71 with a set of lenses, called the focus, varying between 50 and 150 mm in order to control the depth of working field and the spot size, i.e. the machining region. By way of example, the spot measures of the order of 0.05 to 0.2 mm. The laser source has a power of between 50 and 300 watts and generates waves in pulsed or continuous form using gases belonging to the group made up of nitrogen, oxygen, air and argon. In this example, the wear indicators 41-43 are cut at a rate of between 20 and 200 nm/min.

According to a first embodiment of the invention, the rotor disk 11 is held in the positioning plate 61 of the stand 6 and is positioned in such a way that the rotor blade 2 that is to be machined extends along the machining axis Yu of the laser head 71, the positioning camera 74 ensuring that the laser head 71 is correctly positioned. Once the rim 22 of the rotor blade 2 is directly facing the laser head 71, the latter emits a laser beam L which causes local melting of the rim 22 of the rotor blade 2, the gas blower 73 blowing the molten material so that the latter cannot contaminate the surface of the rotor blade 2. During laser cutting, the laser beam L moves in a machining plane (X, Z) parallel to the surface of the suction face of the blade. In order to maintain suitable positioning during machining, the laser head 71 is designed to pivot about an axis A, depicted in FIG. 6, which in this instance is parallel to the Z-axis.

The molten material is then collected by collecting means, for example by a suction duct situated near the wear indicators 41-43. By virtue of the method according to the invention, the radial notches that define the wear indicators 41-43 can be formed in the rotor blade 2 quickly and in a practical way. As illustrated in FIG. 3, the wear indicator 41 takes the form of a curved radial notch that passes through the rim 22 of the bathtub squealer 23, revealing the thermal barrier coating RT of the rotor blade 2.

Thanks to the laser machining, the rotor blade 2 is machined without affecting its thermal barrier coating RT while at the same time maintaining the precise geometries of the wear indicators 41-43. Moreover, the rotor blades 2 do not have to be removed from the rotor disk 11 during machining. In other words, coated rotor blades 2 mounted on their rotor disk 11 can be re-machined after these blades have been surface ground.

According to a second embodiment of the invention, the machining device 5 comprises, in addition to the stand 6 and the laser module 7, a plug 8 for collecting the molten material of the blade 2.

Figure 5:
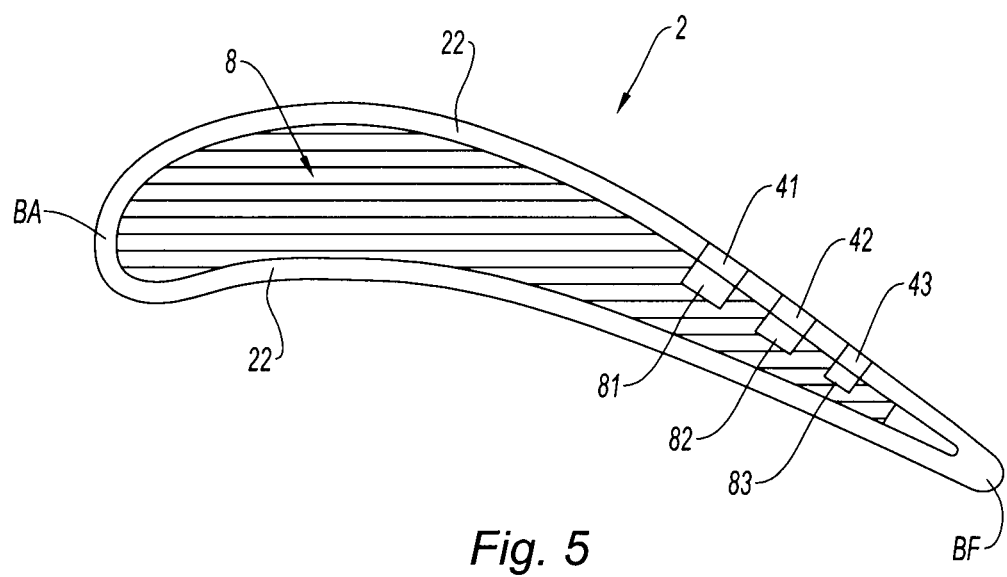
FIG. 5 is a view in section of the bathtub squealer of the blade of FIG. 2, into which a plug has been inserted.

As depicted in FIGS. 5 to 6, the plug 8 is housed in the bathtub squealer 23 of the rotor blade 2 so as to collect the molten material of the blade 2 during the laser machining of the wear indicators 41-43. The plug 8 extends substantially radially and has a cross section suited to the shape of the bathtub squealer 23 so that the plug 8 can be in contact with the bottom wall 21 of the bathtub squealer 23 and with the rim 22 of the bathtub squealer 23. In other words, the plug 8 comprises a cylindrical body intended to be mounted in the bathtub squealer 23, the body comprising a lower wall intended to be in contact with the bottom wall 21 of the bathtub squealer 23, a side wall 84 intended to be in contact with the rim 22 and an upper wall 85. For preference, the plug 8 is elastic and is compressed as it is inserted into the bathtub squealer 23 so as to be prestressed in this position when in the mounted position, thus guaranteeing that it is correctly positioned in the bathtub squealer 23. The plug 8 preferably is made of Teflon so as to be able to withstand the heat of the laser beam L during the machining of the wear indicators 41-43.

As depicted in FIG. 6, the side wall 84 of the plug 8 comprises at least one receiving cavity 81-83 intended to receive the molten material of the rotor blade 2. In this example, the plug 8 comprises three receiving cavities 81-83 which extend from the side wall 84 toward the upper wall 85 of the plug 8 and form internal ducts for the removal of the molten material. In other words, with reference to FIG. 6, the internal ducts open into the upper wall 85 of the plug 8 via orifices 81', 82', 83'.

As depicted in FIG. 5, since the rotor blade 2 comprises three radial notches 41-43, the plug 8 comprises three receiving cavities 81-83 which are formed facing the radial notches 41-43. Advantageously, with reference to FIG. 6, following the machining for example of the wear indicator 41, the molten material of the blade 2 drops under gravity and/or under the effect of the gas blower 73, into the receiving cavity 81 of the plug 8 that faces the wear indicator 41, where it can be collected. Advantageously, the molten material does not drop into the bathtub squealer 23 and does not adhere to the surface of the rotor blade 2, which means that contamination of said blade 2 is avoided. Because the plug 8 is prestressed in the bathtub squealer 23 and because the orifices are positioned facing the wear indicators, the risk of contaminating the blade is greatly reduced.

In this example, with reference to FIG. 6, each receiving cavity 81-83 extends from the side wall 84 toward the upper wall 85 of the plug 8 so as to allow the molten material of the blade 2 to be removed via the upper wall 85 of the plug 8. It goes without saying that a receiving cavity 81-83 could open onto some other wall of the plug 8 for the purposes of removing the molten material. Likewise, a receiving cavity 81-83 could be blind but deep enough to collect the molten material, it then being necessary for the plug 8 to be removed from the bathtub squealer 23 in order to allow the molten material to be removed via the side wall 84 of the plug 8. For preference, one and the same plug 8 is used for machining several rotor blades 2 in succession, the plug 8 being cleaned if need be between two successive uses.

In this embodiment, the thickness of the plug 8, that corresponds to the radial dimension along the X-axis in FIG. 6, is greater than the height of the rim 22 so that the plug 8 protrudes from the bathtub squealer 23. It goes without saying that the thickness of the plug 8 could also be substantially equal to, or even less than, the height of the rim 22 of the bathtub squealer 23.

According to a preferred embodiment of the invention, with reference to FIG. 4, the machining device 5 further comprises a module 9 for immobilizing the blade 2 in the machining position. This immobilizing module 9 is designed to apply a pressure force Fp to the upper wall 85 of the plug 8 in the X-direction in which the blade 2 being machined extends. Advantageously, any movement of the blade 2 with respect to the rotor disk 11 is limited by the force Fp applied by the immobilizing module 9. The rotor blade 2 is thus immobilized during machining, its connection to the rotor disk not disrupting the machining operation. Thus, advantageously, when the thickness of the plug 8 is greater than the height of the rim 22, the risk of the immobilizing module striking the rim 22 is limited, the plug 8 also performing a damping interface function.

In this embodiment, with reference to FIG. 4, the immobilizing module 9 takes the form of an actuator, in this instance a hydraulic actuator, but it goes without saying that other means (spring, etc) might also be suitable. The actuator is in contact with the plug and does not damage the blade.

For preference, the machining device 5 is arranged in a machining booth 10 containing projective panels, preferably transparent ones, that protect the elements of the device 5. Machining can be monitored visually by an operator situated outside the booth in complete safety. It goes without saying that the machining can also be filmed using a camera and relayed to a monitor that the operator monitors.

The invention has been described in relation to a turbine blade but it goes without saying that the invention applies to any rotor blade, particularly a compressor blade.

The invention claimed is:

1. An elastic plug for implementing a method for machining a wear indicator in an aircraft gas turbine engine rotor blade including machining a radial notch defining the wear indicator in a rim of a bathtub squealer formed at an end of the blade using a laser so as to melt part of the blade, and collecting the molten material of the blade, the plug comprising:
    a monolithic, elastic body intended to be compressed and mounted in the bathtub squealer formed at the end of the aircraft gas turbine engine rotor blade, the body comprising
        a lower wall intended to be in contact with a bottom wall of the bathtub squealer,
        a side wall intended to be in contact with the rim of the bathtub squealer, the side wall presenting a shape corresponding to a pressure face side and a suction face side of the blade, and
        an upper wall,
    wherein said side wall comprises a receiving cavity which opposes the wear indicator when the plug is housed in the bathtub squealer and is intended to receive the molten blade material.

2. The plug as claimed in claim 1, wherein the receiving cavity extends from the side wall to the upper wall of the plug.

3. The plug as claimed in claim 1, wherein a radial thickness of the plug is greater than a height of the rim.

4. A device for machining a rotor blade mounted radially on an aircraft gas turbine engine rotor disk for implementing a method for machining a wear indicator in an aircraft gas turbine engine rotor blade including machining a radial notch defining the wear indicator in a rim of a bathtub squealer formed at an end of the blade using a laser so as to melt part of the blade, and collecting the molten material of the blade, the device comprising:
    a stand for positioning the rotor disk;
    a laser machining module designed to emit a laser beam toward the rotor blade so as to form a wear indicator;
    a plug as claimed in one of claims 1 and 2, the plug being housed in the bathtub squealer formed at the end of said rotor blade; and
    a module for immobilizing the blade in the machining position and designed to apply a radial pressure force to the plug in order to immobilize the blade.

* * * * *